(12) United States Patent  (10) Patent No.: US 9,251,070 B2
Cho                              (45) Date of Patent:    Feb. 2, 2016

(54) METHODS AND APPARATUS FOR MULTI-LEVEL CACHE HIERARCHIES

(71) Applicant: ADVANCED MICRO DEVICES, INC., Sunnyvale, CA (US)

(72) Inventor: Jin Haeng Cho, Acton, MA (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 177 days.

(21) Appl. No.: 13/720,549

(22) Filed: Dec. 19, 2012

(65) Prior Publication Data

US 2014/0173208 A1    Jun. 19, 2014

(51) Int. Cl.
*G06F 12/08* (2006.01)
(52) U.S. Cl.
CPC ........ *G06F 12/0811* (2013.01); *G06F 12/0897* (2013.01)
(58) Field of Classification Search
None
See application file for complete search history.

(56) References Cited

U.S. PATENT DOCUMENTS

| 5,848,428 A | * | 12/1998 | Collins | 711/127 |
| 6,349,363 B2 | * | 2/2002 | Cai et al. | 711/129 |
| 2011/0113198 A1 | * | 5/2011 | Cheng et al. | 711/128 |

OTHER PUBLICATIONS

Rothman et al, "The Pool of Subsectors Cache Design", Report No. UCB/CSD-99-1035, Jan. 1999.*
Lee, "Stack Value File: Custom Microarchitecture for the Stack," High-Performance Computer Architecture, 2001, HPCA, The Seventh International Symposium, 2001, IEEE Xplore Digital Library, accessed Nov. 2, 2012.

* cited by examiner

*Primary Examiner* — Aimee Li
*Assistant Examiner* — Tracy Chan
(74) *Attorney, Agent, or Firm* — Park, Vaughan, Fleming & Dowler LLP

(57) ABSTRACT

A multi-level cache structure in accordance with one embodiment includes a first cache structure and a second cache structure. The second cache structure is hierarchically above the first cache. The second cache includes a tag array comprising a plurality of tag entries corresponding to respective addresses of data within a system memory; a selector array associated with the tag array; and a data array configured to store a subset of the data. The selector array is configured to specify, for each corresponding tag entry, whether the data array includes the data corresponding to that tag entry.

18 Claims, 7 Drawing Sheets

METHODS AND APPARATUS FOR MULTI-LEVEL CACHE HIERARCHIES

TECHNICAL FIELD

Embodiments of the subject matter described herein relate generally to integrated circuit devices. More particularly, embodiments of the subject matter relate to multi-level cache structures used in connection with processors and other integrated circuit devices.

BACKGROUND

Modern microprocessors often employ a multi-level cache structure to expedite the reading and writing of data associated with the main system memory. Such multi-level cache structures are typically characterized by a hierarchy that includes a level-1 cache (L1), a level-2 cache (L2), and sometimes a level-3 cache (L3). In multi-core devices, the various cores may share one or more of these caches. For example, two cores may each have a single L1 cache, but might share a common L2 cache.

Many cache structures are inclusive—i.e., they are configured such that each higher-level cache (e.g., L2) also includes the data stored in the corresponding lower cache (e.g., L1). In such a case, the only scenario where the duplicated data in the higher-level cache does not cost significant overhead and improves performance is when the data in the lower-level cache is not valid and another processor that shares the same higher-level cache requests that data. However, it is known that this scenario rarely occurs in multi-core systems. As a result, inclusive multi-level cache structures typically require more chip space and consume more power than is necessary.

BRIEF SUMMARY OF EMBODIMENTS

A multi-level cache structure in accordance with one embodiment comprises a first cache structure and a second cache structure, wherein the second cache structure is hierarchically above the first cache. The second cache includes a tag array comprising a plurality of tag entries; a selector array associated with the tag array; and a data array configured to store a subset of the data. The selector array is configured to specify, for each corresponding tag entry, whether the data array includes the data corresponding to that tag entry.

A cache structure in accordance with one embodiment comprises a tag array including a plurality of tag entries corresponding to respective addresses of data within a system memory, a selector array associated with the tag array, and a data array configured to store a subset of the data, wherein the selector array is configured to specify, for each corresponding tag entry, whether the data array includes the data corresponding to that tag entry.

A method for caching system memory data in accordance with one embodiment includes providing a first cache structure, providing a second cache structure hierarchically above the first cache structure, wherein the second cache structure includes: a tag array including a plurality of tag entries corresponding to respective addresses of data within the system memory, and a selector array associated with the tag array; storing a subset of the system memory data within a data array of the second cache structure; and indicating that the data array includes the subset of the system memory using the selector array and that tag array.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION OF EMBODIMENTS

The embodiments described herein generally relate to improved multi-level cache structures allow chip size to be reduced with little or no performance impact. In that regard, the following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following

DETAILED DESCRIPTION

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, logic elements, look-up tables, or the like, which may carry out a variety of functions under the control of one or more microprocessors or other control devices.

FIGS. 1A, 1B, 1C and 1D present schematic block diagrams of exemplary memory hierarchies useful in understanding various embodiments discussed herein. It will be understood that the embodiments illustrated in FIGS. 1A-D are merely presented as examples, and that the present embodiments may be used in the context of a wide range of multi-level cache structures.

Figure 1C:
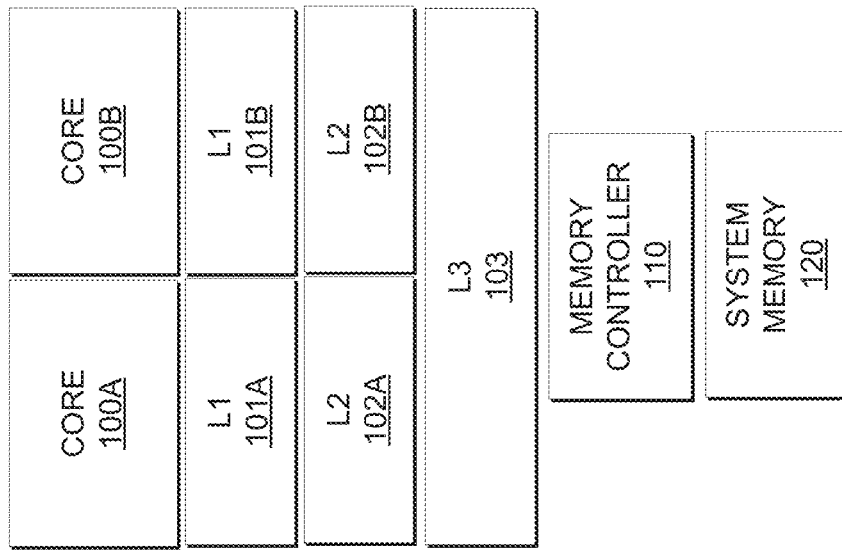
FIGS. 1A, 1B, 1C, and 1D are schematic block diagrams of exemplary memory hierarchies.
Figure 1B:
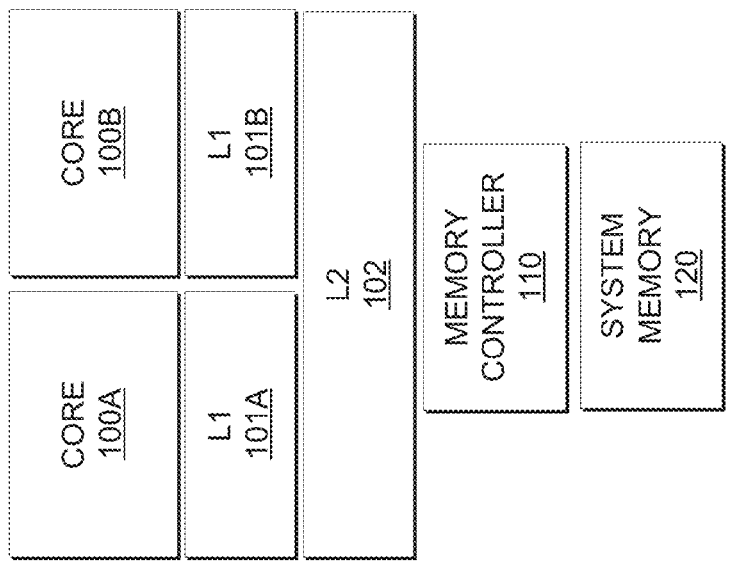
Figure 1A:
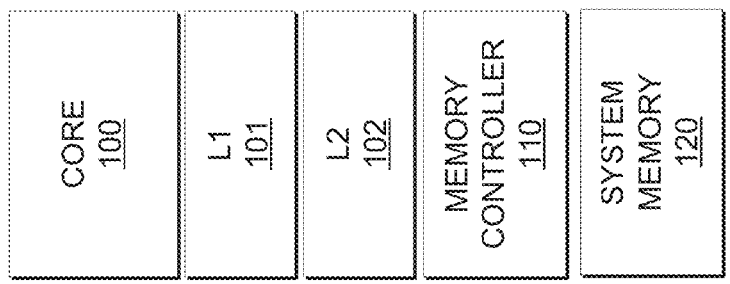
Figure 1D:
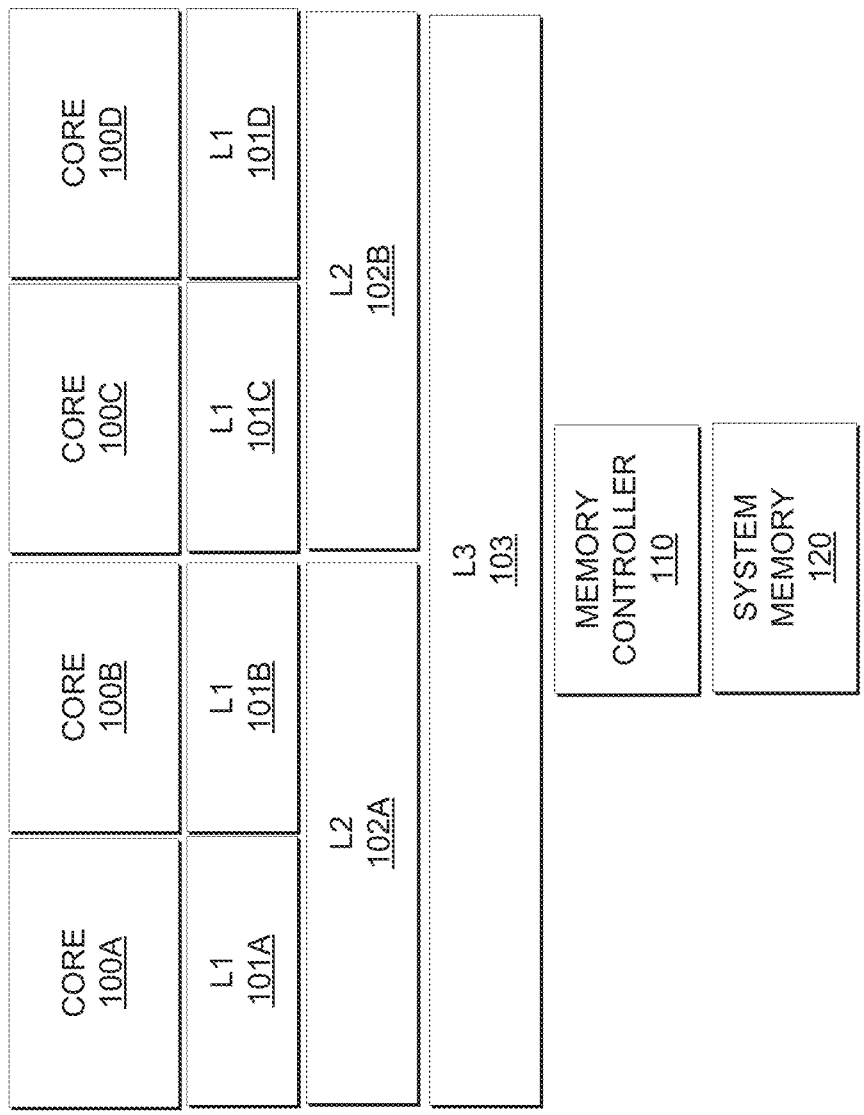

Referring first to FIG. 1A, an exemplary memory hierarchy for use in a single-core context includes a system memory 120 (e.g., DRAM or any other suitable form system memory), a memory controller 110, a core (e.g., a microprocessor core, as that term is commonly known), and a multi-level cache structure comprising a level-1 cache (L1) 101 and a level-2 cache (L2) 102. Assuming that L2 cache 102 is an inclusive cache, it is configured such that it also includes the data stored in its corresponding lower-level cache (i.e. L1). In contrast, FIG. 1B illustrates a multi-core embodiment wherein two cores (cores 100A and 100B) each have their own dedicated L1 cache (L1 caches 101A and 101B, respectively) but share a common L2 cache 102. Similarly, FIG. 1C presents a multi-level cache structure in which core 100A has its own dedicated L1 and L2 caches (L1 cache 101A and L2 cache 102A), core 100B has its own dedicated L1 and L2 caches (L1 cache 101B and L2 cache 102B), and both share a common L3 cache 103. FIG. 1D depicts yet another example in which two L1 caches (e.g., 101A and 101B) share a common L2 cache (cache 102A).

The term "higher-level cache" is used herein to refer to a cache structure is that hierarchically above L1 (i.e., L2, L3, etc.). Similarly the term "lower-level cache" is used to refer to a cache structure that is lower in the hierarchy than (or "hierarchically below") the highest cache in the cache structure. For example, in FIG. 1A L2 cache 102 is a higher-level cache, while L1 is a lower-level cache. In FIG. 1C, L2 cache 102A, L2 cache 102B, and L3 cache 103 may all be considered higher-level caches.

The general operation of conventional multi-level cache structures, memory controllers, and system memories as shown in FIG. 1 are well known in the art, and need not be discussed in detail herein. However, it may be instructive to describe the various arrays and indices of a typical higher-level cache structure.

Figure 2:
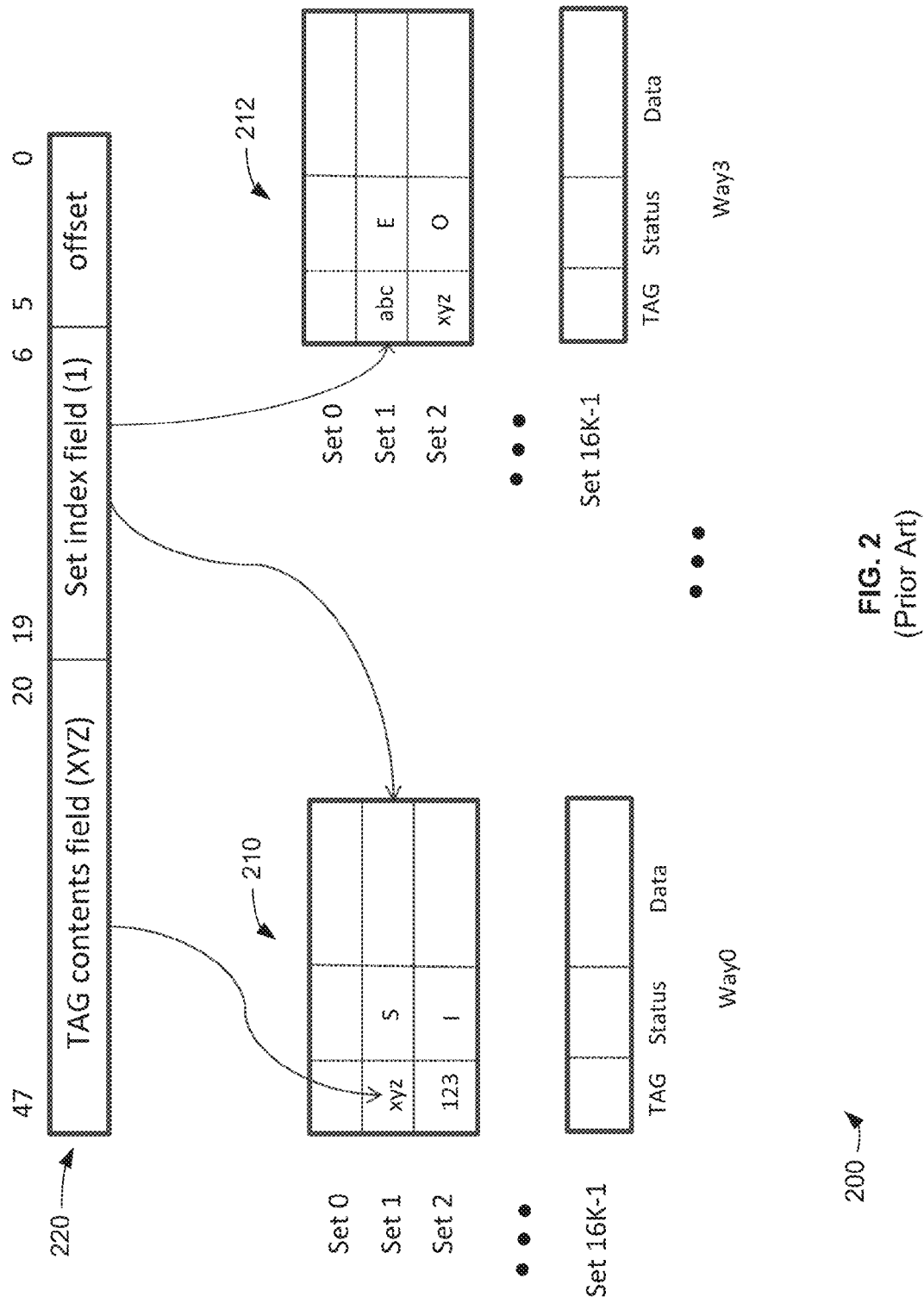
FIG. 2 is a schematic representation of a traditional cache structure.

Referring to FIG. 2, a conventional higher-level cache structure 200 will now be described in relation to an example cache line address 220. In this example, cache line address (or simply "address") 220 is 48-bits long, designated by the corresponding numerals 0 through 47 as shown in the figure. Bits 0-5 correspond to offset bits (not used in this example), bits 6-19 correspond to a set index field, and bits 20-47 correspond to the tag contents field, as is known in the art. It will be further assumed that FIG. 2 illustrates a 4 MB cache with 64 bytes per cache-line.

Cache structure 200 includes four "ways," such as way 0 (210) and way 3 (212) (for simplicity, way 1 and way 2 are not illustrated). In this regard, a cache structure is characterized, in part, by its associativity. The associativity of a cache structure relates to where cache lines may be placed within a cache by a cache controller. In some embodiments, the cache structure is set-associative, where a "set" is a group of blocks. If there are n blocks in a set, the cache is called n-way set associative. A "direct-mapped" cache (also known as a single-set associative array) has a single block per set, and a "fully associative" cache is n-way cache array where n is a $2^{(number\ of\ tag\ bits)}$. The example depicted in FIG. 2, for example, is a 4-way associative cache structure, wherein each way (e.g., 210 and 212) can be represented logically as an array comprising a number of rows (one per set) and three columns (or "fields"). The three fields include a tag field, a status field, and a data field, respectively. In the illustrated embodiment, each way includes 16K sets, and each set is characterized by a set index (e.g., set 0, set 1, etc.).

The tag field contains parts of a cacheable memory request address that are not used for the set index and offset. It is assumed that if a tag entry for a certain set is indexed by a set index field, it has the same contents as the tag contents field in cache request address 220. If it is assumed that cache structure 200 of FIG. 2 corresponds to the L2 cache 102 of FIG. 1A, then a particular tag entry indicates or is otherwise associated with the address of a particular cache line within system memory 120. Further assuming that cache structure 200 is inclusive, then it will include all data entries of the data array of L1 cache 101, as well as additional data entries.

In the example depicted in FIG. 2, the set index field of 220 contains the number 1, which indicates set 1. Among the four tags in the corresponding ways of set 1, the tag for way 0 contains "xyz," which matches the tag contents field in cache address 220. The cache status for this entry is valid (i.e., not "I"), so cache block 210 includes data for the cache request addressed in 220. For simplicity, it is assumed that ways 1 and 2 (not shown) include a valid cache entry. The mappings to ways 210 and 212 from the tag contents field and set index field of 220 are illustrated by the respective arrows.

The status field within each way includes a set of status bits or status entries that indicate the status of a corresponding data entry. In this regard, a variety of status codes may be used, depending upon the embodiment. In one embodiment, for example, the "MOESI" protocol is used, in which any given data entry has one of five states: (1) Modified, (2) Owned, (3) Exclusive, (4) Shared, or (5) Invalid. Details of the MOESI protocol can be found, for example, in the AMD64 Architecture Programmers Manual, Vol. 2, rev. 3.22 (2012).

The cache size, associativity, address size, and cache line size of cache structure 200 will typically vary depending upon the application. As mentioned above, cache structure 200 as illustrated is a 4 MB L2 cache with 4-way set associativity (giving 16K sets), has a 48 bit address, and a 64-byte cache line size. Each tag entry then uses 48−20=28 bits.

As mentioned briefly above, the only scenario where the duplicated data in an inclusive higher-level cache such as cache structure 200 does not cost additional overhead and improves performance is when the data in the lower level cache (e.g., L1 cache 101A of FIG. 1B) is not valid (as determined by its status entry) and another processor (e.g., core 100B) that shares the same higher-level cache (L2 cache 102) requests that data.

Cache structures in accordance with various embodiments address the above issue by reducing the size of the data array in the higher-level cache while at the same time introducing an additional "selector" array.

Figure 3:
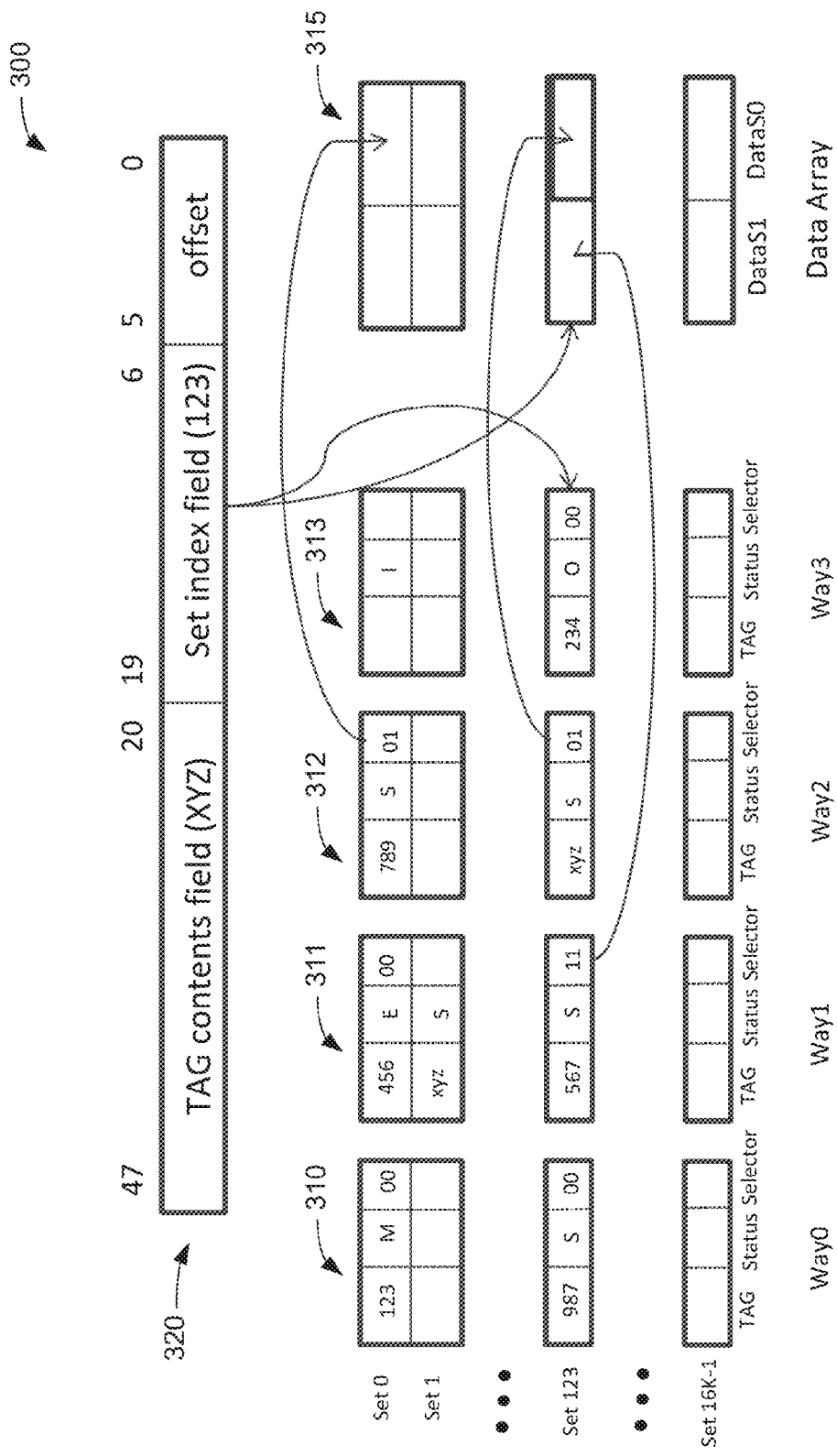
FIGS. 3 and 4 present schematic representations of a cache structure in accordance with an exemplary embodiment.

Referring now to FIG. 3, a cache structure 300 in accordance with one embodiment comprises four ways: ways 0 through 3 (designated 310, 311, 312, and 313, respectively). Cache structure 300 also includes a data array 315 comprising two columns, labeled DataS1 and DataS0. While cache structure 300 is 4-way set associative like cache structure 200, its data array 315 includes only two ways (i.e., it includes two, rather than four, columns). As a consequence, it has a size that is approximately half that of cache structure 200. As with the previous example, cache line address 320 is assumed to be 48-bits long, designated by the corresponding numerals 0 through 47 as shown in the figure. Bits 0-5 correspond to offset bits, bits 6-19 correspond to a set index field, and bits 20-47 correspond to the tag contents field.

Cache structure 300 also includes an added field within each way 310-313—i.e., a "selector" field configured to store selector entries. The selector entries may be collectively referred to herein as a "selector array" (although they are not necessarily stored in a contiguous physical array). In general, the selector entries within the selector array are configured to indicate whether their respective data entries are actually present within data array 315. That is, as illustrated, data array 315 can only hold two data entries per set, while the correspondingly ways 310, 311, 312, and 313 each include four tag entries. The tag entries are therefore associated with only a subset of the plurality of data entries within data array 315. Accordingly, up to half of the data entries of a given set will be missing from data array 315. Each selector entry within a selector field therefore suitably indicates which two tags within a given set actually corresponds to a data entry within data array 315.

In one embodiment, for example, each selector entry consists of two bits that together indicate whether the data corresponding to its tag entry is stored within data array 315, and if so, where. For example, 00 may indicate "no data", 01 may indicate "right column" (DataS0), and 11 may indicate "left column" (DataS1).

Thus, assume for the sake of example that the selector entries of set 123 include, from left to right, the following series of two-bit numbers: {00, 11, 01, 00}, and the tag entries of set 123 include, from left to right, the entries "987", "567", "xyz", and "234". This would indicate that (1) the data corresponding to tag entry "987" is not included within data array 315, (2) the data corresponding to tag entry "567" is included in the left column of data array 315, (3) the data corresponding to tag entry "xyz" is included in the right column of data array 315, and (4) the data corresponding to tag entry "234" is not included within data array 315. The mappings of selector entries to the two columns of data array 315 within set 123 are illustrated by corresponding arrows.

The least significant bit of a given selector entry (e.g., the rightmost bit in the above example) may be referred to as a "data-valid" bit in that it indicates whether that data is located within the data array (i.e., is "valid"). Similarly, one or more of the most significant bits (e.g., the leftmost bit in the above example) may be referred to as a "way-selector" bit, since it indicates the "way" (i.e., with respect to associativity) that the data is stored (e.g., in the left or right column) In direct-mapped memory array embodiments, however, a way-selector bit is not required: selector entries may consist of simply a data-valid bit.

Figure 4:
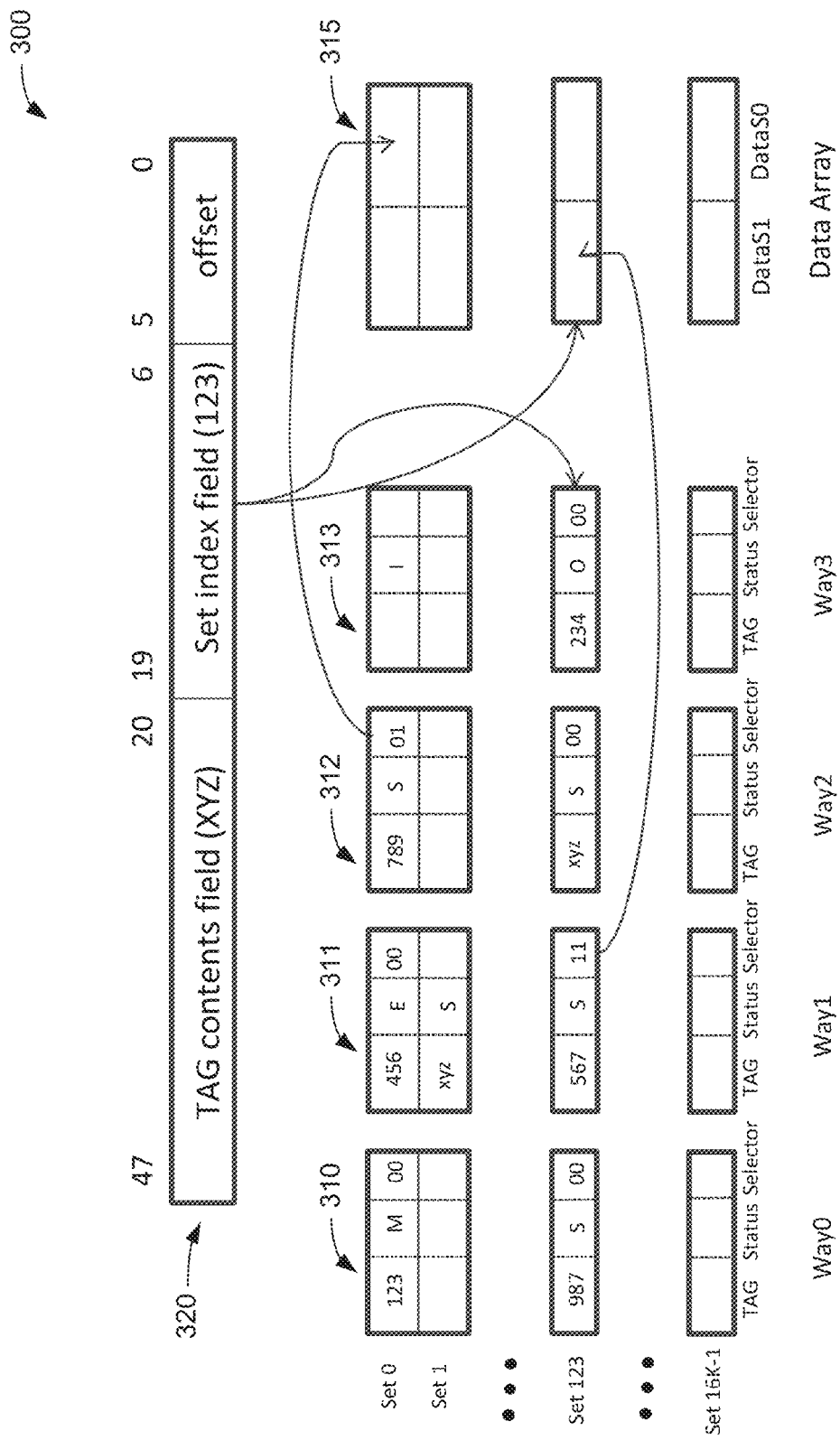

FIG. 4 depicts how the cache structure 300 of FIG. 4 might change in response to a new cache request hit on set 123 and way 2 when the status entry is "S" (shared) but the data is not found in data array 315. In this example, the cache controller sends a memory read request to get data from the system memory. As DataS0 is available for set 123 (i.e., it contains no valid data) the data is then stored in DataS0 and the selector entry for way 313 is updated to "01".

Figure 5:
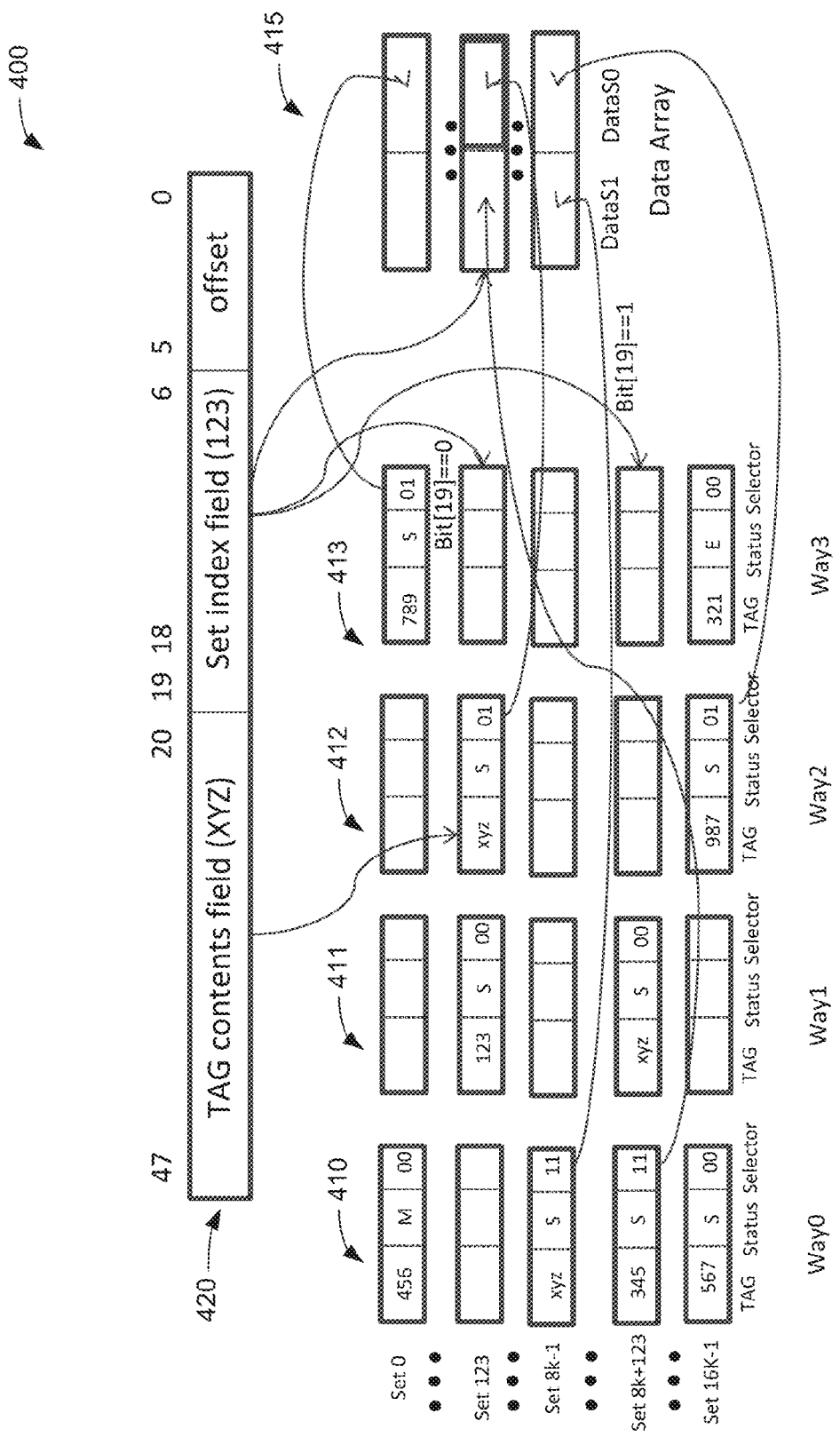
FIG. 5 is a schematic representation of a cache structure in accordance with an exemplary embodiment.

FIG. 5 shows an alternate embodiment of a cache structure 400 and a cache line address 420. As with the embodiment shown in FIG. 4, cache structure 400 includes four ways (410-413), and a data array 415 having two columns (i.e., two ways). However, in this embodiment, the number of rows (or sets) within data array 415 is reduced by half. The set index field bits[19:6] from cache address 420 are used to select the tag set, but bit [19] is not used for data array set selection, thus tag sets [0:8K-1] and sets [8K:16K-1] share the same range of data array 415. By way of example, the arrows shown in FIG. 5 depict the mapping of various fields and indices to and from cache line address 420 and data array 415. As shown, it is assumed that bit 19 of cache line address 420 for set 123 is zero (FALSE), and bit 19 of cache line address 420 for set 8K+123 is one (TRUE). In FIG. 5, the set index field is 123, so bit[19] is 0 and the tag field in set 123 is looked up for comparison. Way 2 has a matching tag, 'xyz', so the status and selector fields in 412 indicate that data is available in the DataS0 column of data array 415.

Figure 6:
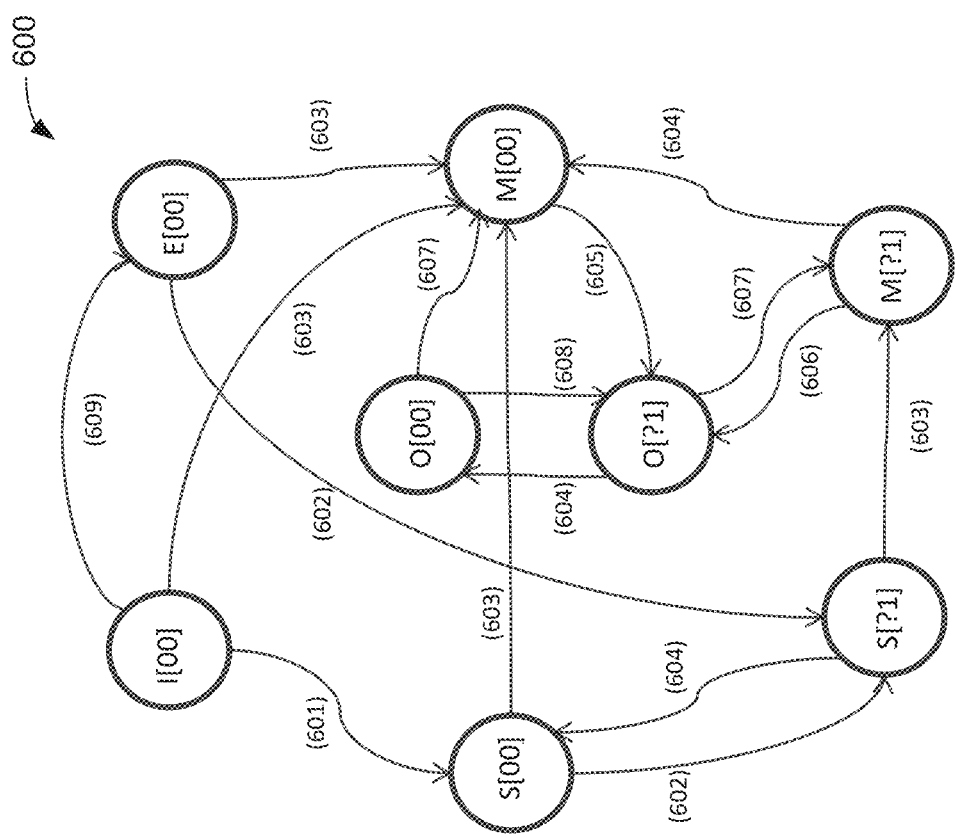
FIG. 6 is a state diagram depicting operation of a cache structure in accordance with an exemplary embodiment.

In accordance with various embodiments, the allocation of data within the data array is based on a state diagram that takes as its inputs, among other things, the status entries. For example, data allocation may be based cache status information (e.g., the MOESI state) and selector information. In this regard, FIG. 6 depicts a state diagram 600 corresponding to a data allocation policy in accordance with one embodiment. FIG. 6 has been simplified and does not include certain transitions, e.g., transitions that do not change cache status and selector state.

As shown, state diagram 600 is a directed graph including a set of circles representing various states, and a set of arrows or "edges" representing transitions from one state to another. Each state is labeled such that it includes a letter corresponding to a MOESI state—i.e., M, O, E, S, or I—followed by a two bit selector entry enclosed in brackets. The question mark indicates either 0 or 1 (i.e., "do not care."). In general, state diagram 600 implements a system with the following priority: if the other tag's status is not S, then replace it. If all data entries tags are in the S state, then select the entry using a standard least-recently-used (LRU) algorithm.

Each of the transitions are labeled with a number ranging from 601 to 609. In the illustrated embodiment, the meanings of these transitions are as presented in the following table.

| | |
|---|---|
| 601 | Read for share: get data from memory and do not allocate data. |
| 602 | Read from other core to share data. |
| 603 | Write hit: change cache status to "M". |
| 604 | Data allocation request for same cache set but different way: change data selector to 00. |
| 605 | Read from other core to share data: allocate data entry and probe lower level cache to get data. |
| 606 | Read from other core to share data. Data is already available, so only change cache state to O |
| 607 | Write hit: send invalidate request to other core and change cache state to "M". |
| 608 | Read from other core to share data: allocate data entry and probe lower level cache to get data. No cache state change |
| 609 | Read for exclusive from memory, but do not allocate data. |

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A multi-level cache structure comprising:
   a first cache structure;
   a second cache structure, the second cache structure being hierarchically above the first cache; and
   the second cache comprising a tag array comprising a plurality of tag entries corresponding to respective addresses of data within a system memory; a selector array associated with the tag array; and a data array configured to store a subset of the data, wherein the tag array has an N-way associativity and the data array has M ways, where N and M are integers, with N being a larger integer than M;
wherein the selector array comprises a plurality of bits that indicate, for each corresponding tag entry, whether or not data corresponding to the tag entry is present in the data array, and, when the data corresponding to the tag entry is present in the data array, a position of the data corresponding to the tag entry in the data array.

2. The multi-level cache structure of claim 1, further including a status array associated with the tag array, wherein a validity and status of the data corresponding to each tag entry is determined based on the status array.

3. The multi-level cache structure of claim 1, wherein the plurality of bits that indicate, for each corresponding tag entry, whether or not data corresponding to the tag entry is present in the data array, and, when the data corresponding to the tag entry is present in the data array, a position of the data corresponding to the tag entry in the data array comprise:
    a "data-valid" bit indicating whether or not data corresponding to the tag entry is present in the data array; and
    one or more "way-selector" bits indicating the position of the data corresponding to the tag entry in the data array.

4. The multi-level cache structure of claim 1, wherein the second cache structure is a level-2 cache.

5. The multi-level cache structure of claim 1, wherein the second cache structure is inclusive with respect to the first cache structure.

6. The multi-level cache structure of claim 1, wherein the second cache structure is a set-associative cache.

7. A cache structure comprising:
    a tag array including a plurality of tag entries corresponding to respective addresses of data within a system memory;
    a selector array associated with the tag array; and
    a data array configured to store a subset of the data, wherein the tag array has an N-way associativity and the data array has M ways, where N and M are integers, with N being a larger integer than M;
    wherein the selector array comprises a plurality of bits that indicate, for each corresponding tag entry, whether or not data corresponding to the tag entry is present in the data array, and, when the data corresponding to the tag entry is present in the data array, a position of the data corresponding to the tag entry in the data array.

8. The cache structure of claim 7, further including a status array associated with the tag array, wherein the subset of a validity and status of the data corresponding to each tag entry is determined based on the status array.

9. The cache structure of claim 7, wherein the plurality of bits in the selector array that indicate, for each corresponding tag entry, whether or not data corresponding to the tag entry is present in the data array, and, when the data is present in the data array, the position of the data in the data array comprise:
    a "data-valid" bit indicating whether the data array includes the data corresponding to a tag entry; and
    one or more "way-selector" bits indicating the position of the data corresponding to the tag entry in the data array.

10. The cache structure of claim 9, wherein the cache structure is four-way set associative.

11. The cache structure of claim 7, wherein the cache structure is a level-2 cache.

12. The cache structure of claim 7, wherein the cache structure is inclusive with respect to a lower-level cache structure.

13. The cache structure of claim 7, wherein the cache structure is a set-associative cache.

14. A method for caching system memory data, comprising:
    storing a subset of the system memory data within a data array of a second cache structure, the second cache structure hierarchically above a first cache structure and comprising a tag array including a plurality of tag entries corresponding to respective addresses of data within the system memory; and a selector array associated with the tag array, wherein the tag array has an N-way associativity and the data array has M ways, where N and M are integers, with N being a larger integer than M; and
    indicating that the data array includes the subset of the system memory using the selector array and that tag array, wherein the indicating comprises setting, to corresponding values, some or all of a plurality of bits that indicate, for each corresponding tag entry, whether or not data corresponding to the tag entry is present in the data array, and, when the data corresponding to the tag entry is present in the data array, a position of the data corresponding to the tag entry in the data array.

15. The method of claim 14, further including a status array associated with the tag array, wherein a validity and status of the data corresponding to each tag entry is determined based on the status array.

16. The method of claim 14, wherein the plurality of bits that indicate, for each corresponding tag entry, whether or not data corresponding to the tag entry is present in the data array, and, when the data corresponding to the tag entry is present in the data array, a position of the data corresponding to the tag entry in the data array comprise:
    a "data-valid" bit indicating whether the data array includes the data corresponding to a tag entry; and
    one or more "way-selector" bits indicating the position of the data corresponding to the tag entry in the data array.

17. The method of claim 14, wherein the second cache structure is inclusive with respect to the first cache structure.

18. The method of claim 14, wherein the second cache structure is a set-associative cache.

* * * * *